(12) United States Patent
Jamieson

(10) Patent No.: US 8,893,707 B2
(45) Date of Patent: Nov. 25, 2014

(54) GAS-FIRED HEATER WITH CARBON DIOXIDE DETECTOR

(71) Applicant: Enerco Group, Inc., Cleveland, OH (US)

(72) Inventor: Donald R. Jamieson, Oakville (CA)

(73) Assignee: Enerco Group, Inc., Cleveland, OH (US)

( * ) Notice: Subject to any disclaimer, the term of this patent is extended or adjusted under 35 U.S.C. 154(b) by 163 days.

(21) Appl. No.: 13/705,888

(22) Filed: Dec. 5, 2012

(65) Prior Publication Data

US 2013/0092144 A1    Apr. 18, 2013

Related U.S. Application Data

(63) Continuation of application No. 12/544,442, filed on Aug. 20, 2009, now Pat. No. 8,347,875.

(60) Provisional application No. 61/122,165, filed on Dec. 12, 2008.

(51) Int. Cl.
*F24H 3/00* (2006.01)
*F24C 3/12* (2006.01)
*F24C 3/14* (2006.01)
*F24H 3/04* (2006.01)
*F24H 9/20* (2006.01)

(52) U.S. Cl.
CPC .............. *F24H 9/2085* (2013.01); *F24C 3/122* (2013.01); *F24C 3/14* (2013.01); *F24H 3/0488* (2013.01)
USPC ............... 126/116 A; 126/116 R; 126/116 C; 126/112

(58) Field of Classification Search
USPC ........ 126/116 A, 116 R, 116 C, 112; 431/328
See application file for complete search history.

(56) References Cited

U.S. PATENT DOCUMENTS

| | | | |
|---|---|---|---|
| 1,639,780 | A | 8/1927 | Mulholland |
| 3,139,879 | A | 7/1964 | Bauer et al. |
| 3,590,806 | A | 7/1971 | Locke |
| 3,814,573 | A | 6/1974 | Karlovetz |
| D243,694 | S | 3/1977 | Faulkner |
| 4,201,544 | A | 5/1980 | Briggs et al. |
| 4,307,701 | A | 12/1981 | Balon et al. |
| 4,340,362 | A | 7/1982 | Chalupsky et al. |
| 4,348,172 | A | 9/1982 | Miller |
| 4,640,680 | A | 2/1987 | Schilling |

(Continued)

FOREIGN PATENT DOCUMENTS

| | | |
|---|---|---|
| GB | 253043 | 6/1926 |
| JP | 54-116747 | 9/1979 |

(Continued)

OTHER PUBLICATIONS

O'Meara Camping Centers (web page), Cookers & Heaters, "Alvima Carasol 3b Heater," data sheets, pp. 1-7, Jun. 26, 2002.

(Continued)

*Primary Examiner* — Alfred Basichas
(74) *Attorney, Agent, or Firm* — Brouse McDowell; Michael G. Craig

(57) ABSTRACT

A portable gas-fired heater comprising a housing, a burner assembly, and a carbon dioxide detector system. The housing is adapted to at least partially enclose a fuel source. The burner assembly is enclosed by the housing.

20 Claims, 20 Drawing Sheets

(56) References Cited

U.S. PATENT DOCUMENTS

| | | |
|---|---|---|
| 4,782,814 A | 11/1988 | Cherryholmes |
| 4,843,313 A | 6/1989 | Walton |
| 4,848,313 A | 7/1989 | Velie |
| 5,090,899 A | 2/1992 | Kee |
| 5,174,751 A | 12/1992 | Chapman et al. |
| 5,239,979 A | 8/1993 | Maurice et al. |
| 5,470,018 A | 11/1995 | Smith |
| 5,546,925 A | 8/1996 | Knight et al. |
| 5,628,303 A | 5/1997 | Ahmady et al. |
| 5,645,043 A | 7/1997 | Long et al. |
| D391,345 S | 2/1998 | Mandir et al. |
| 5,807,098 A | 9/1998 | Deng |
| 5,838,243 A | 11/1998 | Gallo |
| 5,848,585 A | 12/1998 | Long et al. |
| 5,865,618 A | 2/1999 | Hiebert |
| 5,941,699 A | 8/1999 | Abele |
| 5,984,663 A | 11/1999 | Joyce |
| D445,889 S | 7/2001 | Resmo et al. |
| D447,796 S | 9/2001 | Resmo et al. |
| 6,340,298 B1 | 1/2002 | Vandrak et al. |
| 6,446,623 B1 | 9/2002 | Resmo et al. |
| 6,575,154 B1 | 6/2003 | Freeman et al. |
| 6,619,281 B2 | 9/2003 | Resmo et al. |
| 6,648,635 B2 | 11/2003 | Vandrak et al. |
| 6,742,814 B2 | 6/2004 | Resmo et al. |
| 6,792,937 B2 | 9/2004 | Resmo et al. |
| 6,843,244 B2 | 1/2005 | McCalley et al. |
| 6,884,065 B2 | 4/2005 | Vandrak et al. |
| 7,018,200 B2 | 3/2006 | Querejeta et al. |
| 7,300,278 B2 | 11/2007 | Vandrak et al. |
| 8,434,469 B2 | 5/2013 | Vandrak |
| 2005/0037303 A1 | 2/2005 | Bachinski et al. |

FOREIGN PATENT DOCUMENTS

| | | |
|---|---|---|
| JP | S54-116747 | 9/1979 |
| JP | 55-051233 | 4/1980 |
| WO | 2005/036071 A1 | 4/2007 |
| WO | 2007/112089 A2 | 10/2007 |

OTHER PUBLICATIONS

Dynamx Incorporated Warehouse Appliance (web page), Williams-Heaters—Vent-Free Honts,...Models, data sheets, pp. 1-4, Jun. 26, 2002.

AGA, American Gas Association, Fact Sheet, "Oxygen Depletion Sensing (ODS) Systems," Dec. 1984.

Brians of Sheerness, Valor Fires, data sheets, pp. 1-2, Mar. 6, 2002.

Mobil Mobile Gas Supplies, Thurcroft Stove, data sheets, pp. 1-2, Mar. 6, 2002. e Gas Supplies, Thurcroft Stove, data sheets, pp. 1-2.

Mobile Gas Supplies, Mobile Heaters, data sheets, pp. 1-4, Mar. 6, 2002.

Bullfinch (Gas Equipment) Limited, The Simba Range Ultra Safe-Low Cost Mobile Cabinet Heaters, 2 pages.

The Coleman Co., Inc., 3000 BTU Propane Catalytic Heater, instructions for use, pp. 1-4.

PCT International Search Report and the Written Opinion of the International Searching Authority from International Application No. PCT/US2004/32071 mailed on Jun. 14, 2005.

PCT International Search Report and the Written Opinion of the International Searching Authority from International Application No. PCT/US2007/07426 mailed on Sep. 28, 2007.

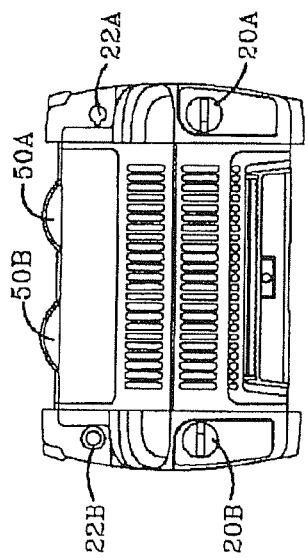
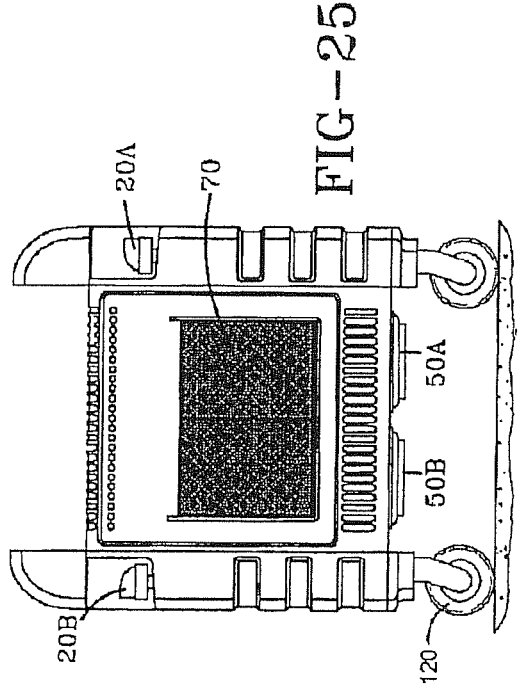
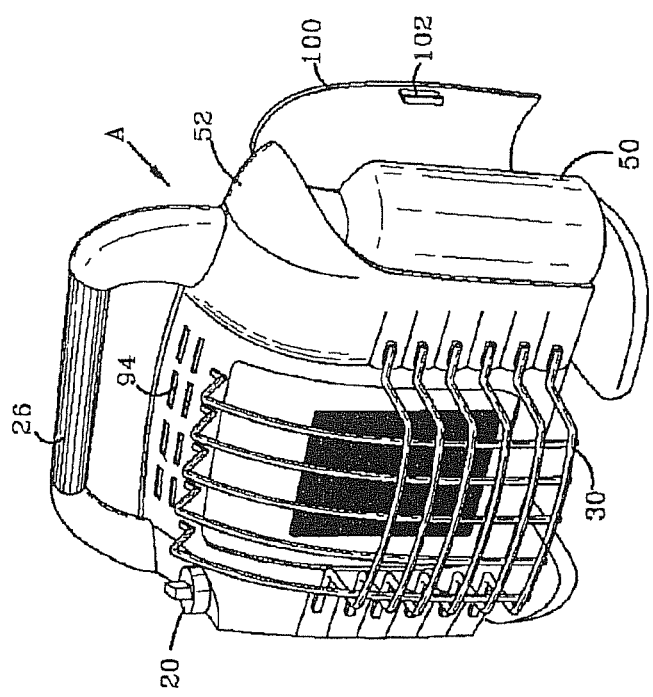

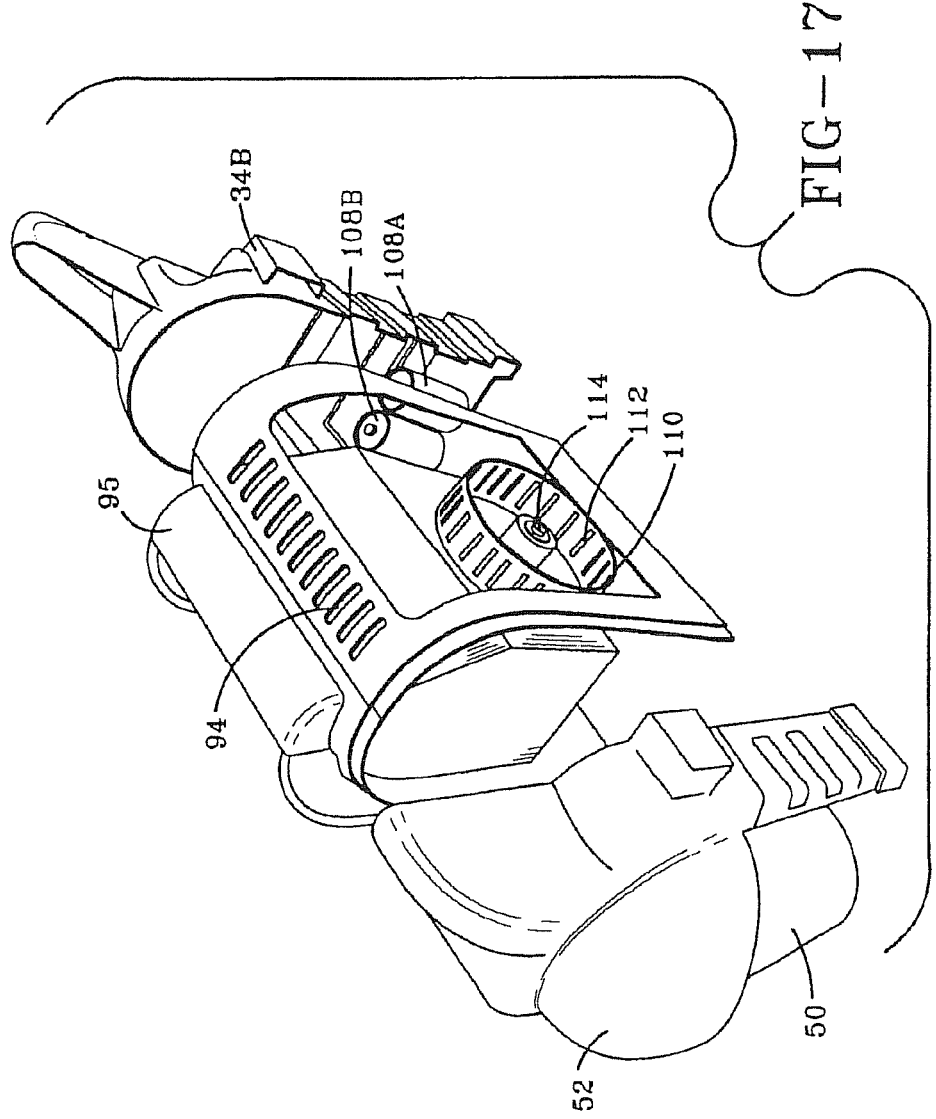

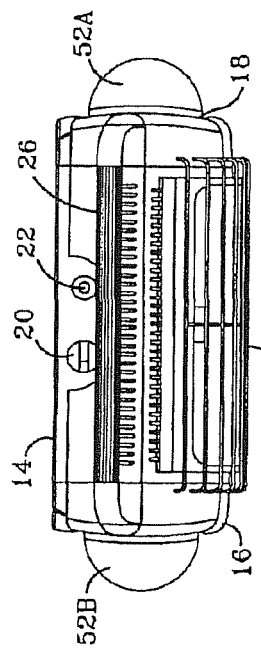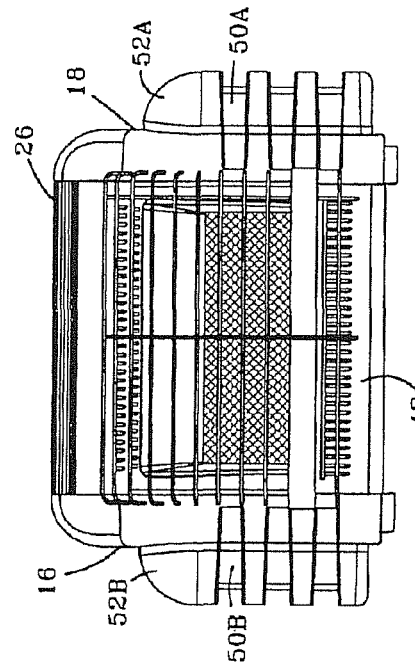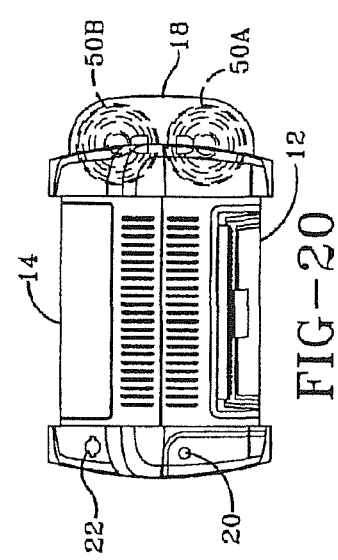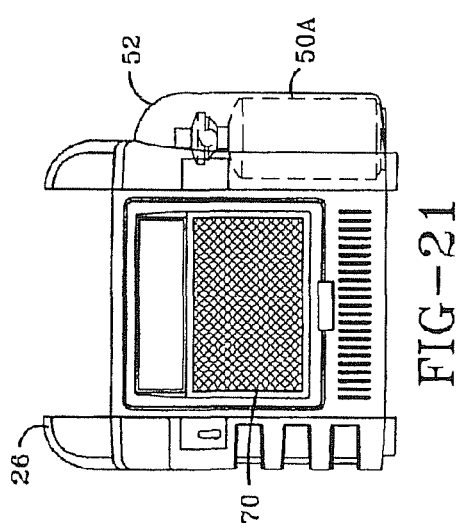

GAS-FIRED HEATER WITH CARBON DIOXIDE DETECTOR

This application is a continuation of and claims priority to U.S. Utility application Ser. No. 12/544,442 entitled GAS-FIRED HEATER WITH CARBON DIOXIDE DETECTOR, filed Aug. 20, 2009, which claims priority to U.S. Provisional Application No. 61/122,165 entitled GAS-FIRED HEATER WITH CARBON DIOXIDE DETECTOR, filed Dec. 12, 2008, both of which are incorporated herein by reference.

TECHNICAL FIELD

Provided is a gas-fired heater comprising a carbon dioxide detector. More particularly, provided is gas-fired heater comprising a carbon dioxide detector-based safety shut-off valve.

BACKGROUND

Gas-fired portable heaters are well known in the art and are used in multiple environments. The heater typically includes a housing having a chamber. The housing has an inlet for receiving air into the chamber. Gas is introduced into the chamber to be mixed with the air in order to complete combustion and provide an infrared heating surface. A plenum directs the heat toward a mesh screen and distributes it over the surface thereof.

The use of such heaters is strictly regulated for outdoor only use due to the emission of carbon monoxide and other potentially harmful combustion products. Prior designs in existing portable units are subject to a wide variety of problems. The prior designs are not safe or certified to operate in small recreational enclosures such as tents, truck-caps, fishing huts, trailers, vans, etc. There are many reasons why the devices found in the prior art are not adequate to perform in such environments. Some previous designs do not have the ability to meet safety regulations regarding combustion requirements at a high and low firing condition and at a reduced pressure. Some designs do not possess an oxygen depletion system ("ODS"). Some designs do not measure or respond to undesirable carbon dioxide levels. These shortcomings have prevented many portable heaters from adequately performing in small recreational and temporary work enclosures.

Therefore, it remains desirable to provide a portable gas-fired heater capable of performing safely in small recreational enclosures and temporary work enclosures.

SUMMARY

Provided is a portable gas-fired heater comprising a housing, a burner assembly, and a carbon dioxide detector system. The housing is adapted to at least partially enclose a fuel source. The burner assembly is enclosed by said housing.

Provided is a portable gas-fired infrared heater comprising a housing, a regulator, burner assembly, a radiant surface, a plenum chamber, and a carbon dioxide detector system. The housing comprises a handle adapted for transporting the heater and an air inlet. The burner assembly is mounted within the housing. The burner assembly comprises a fuel valve adapted to control communication with a fuel source, and a venturi for mixing air from the air inlet and fuel from the fuel valve into a fuel-air mixture. The radiant surface is recessed into the housing. The radiant surface is disposed at an angle to vertical and comprises a rear face. The plenum chamber is adjacent to the radiant surface, is in communication with said radiant surface, and is adapted to distribute said fuel-air mixture onto the rear face of the radiant surface. The carbon dioxide detector system is adapted to shut off the fuel valve in response to detection of a predetermined level of carbon dioxide.

Provided is a portable gas-fired radiant heater comprising a housing, a fuel source, a fuel connection fitting, an air inlet, a burner assembly, a radiant surface, and an automatic shutoff mechanism. The burner assembly is mounted within the housing. The burner assembly comprises a fuel valve adapted to control communication with said fuel source. The radiant surface is in the housing. The radiant surface is adapted to function as a combustion site. The automatic shutoff mechanism is operatively associated with the burner assembly for shutting off the fuel valve in response to a detection of a predetermined level of carbon dioxide.

BRIEF DESCRIPTION OF THE DRAWINGS

FIG. 15 is a perspective view of one embodiment of a portable heater;

FIG. 17 is a top perspective exploded view of one embodiment of a portable heater;

FIG. 20 is a top elevational view of one embodiment of a portable heater with handle and front grill removed;

FIG. 21 is a front elevational view of one embodiment of a portable heater of FIG. 20 showing a fuel source in ghost lines;

FIG. 22 is a top elevational view of one embodiment of a portable heater;

FIG. 23 is a front elevational view of FIG. 22;

FIG. 24 is a top elevational view of one embodiment of a portable heater with handle and front grill removed;

FIG. 25 is a front elevational view of FIG. 24.

DETAILED DESCRIPTION

Figure 1:
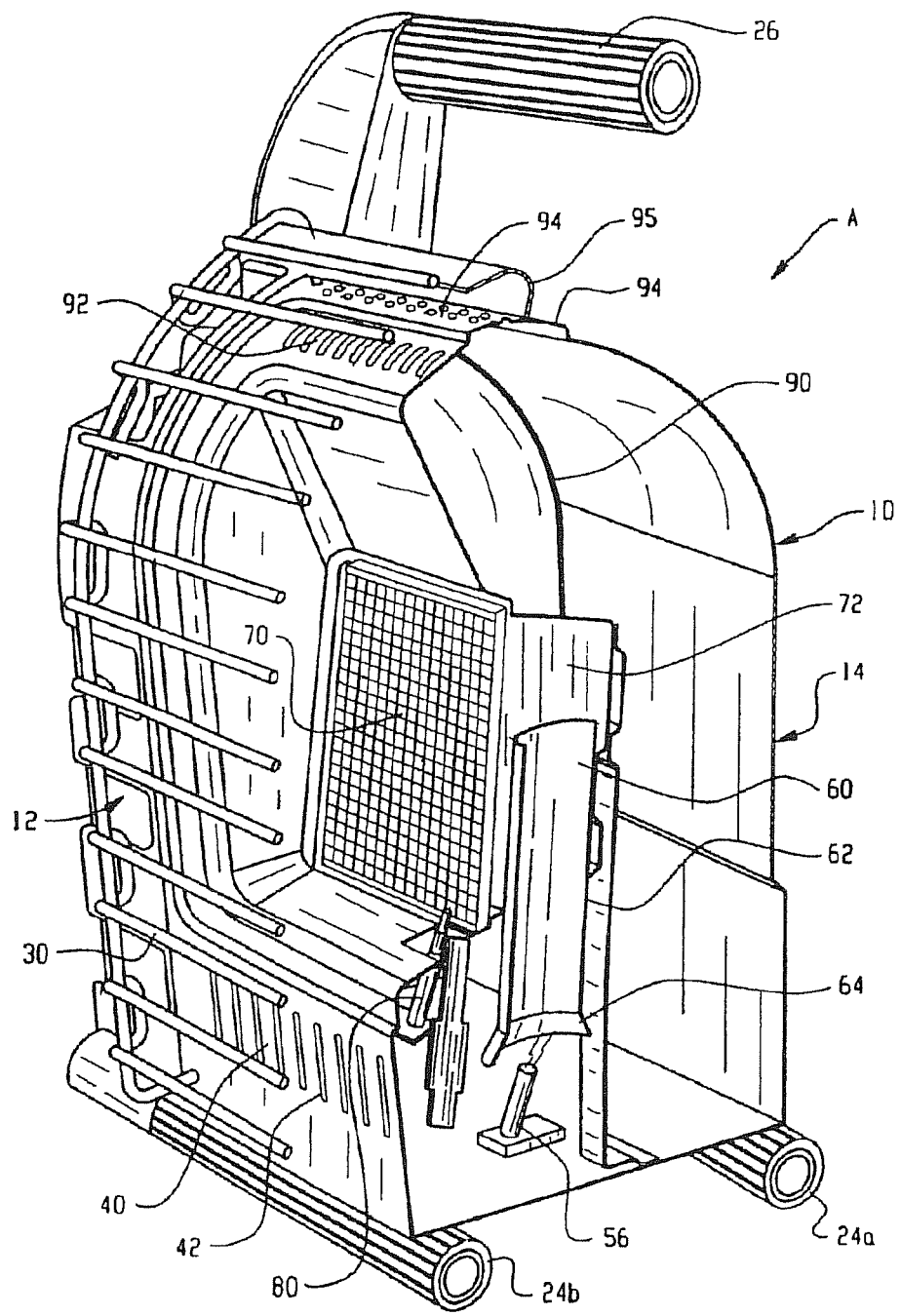
FIG. 1 is a perspective cross-sectional view of one embodiment of a heater assembly.
Figure 2:
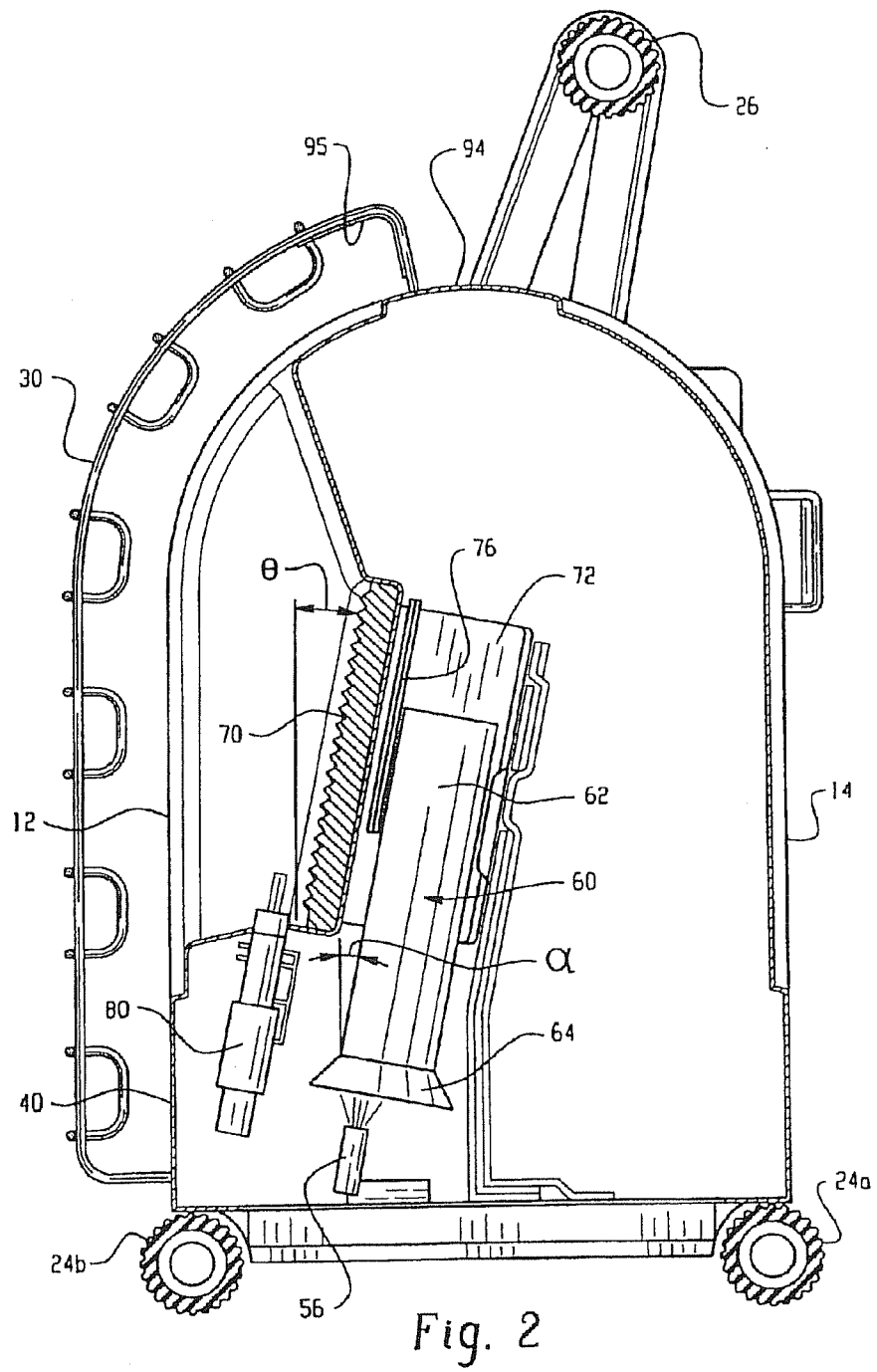
FIG. 2 is a longitudinal cross-sectional view of one embodiment of a heater assembly.
Figure 3:
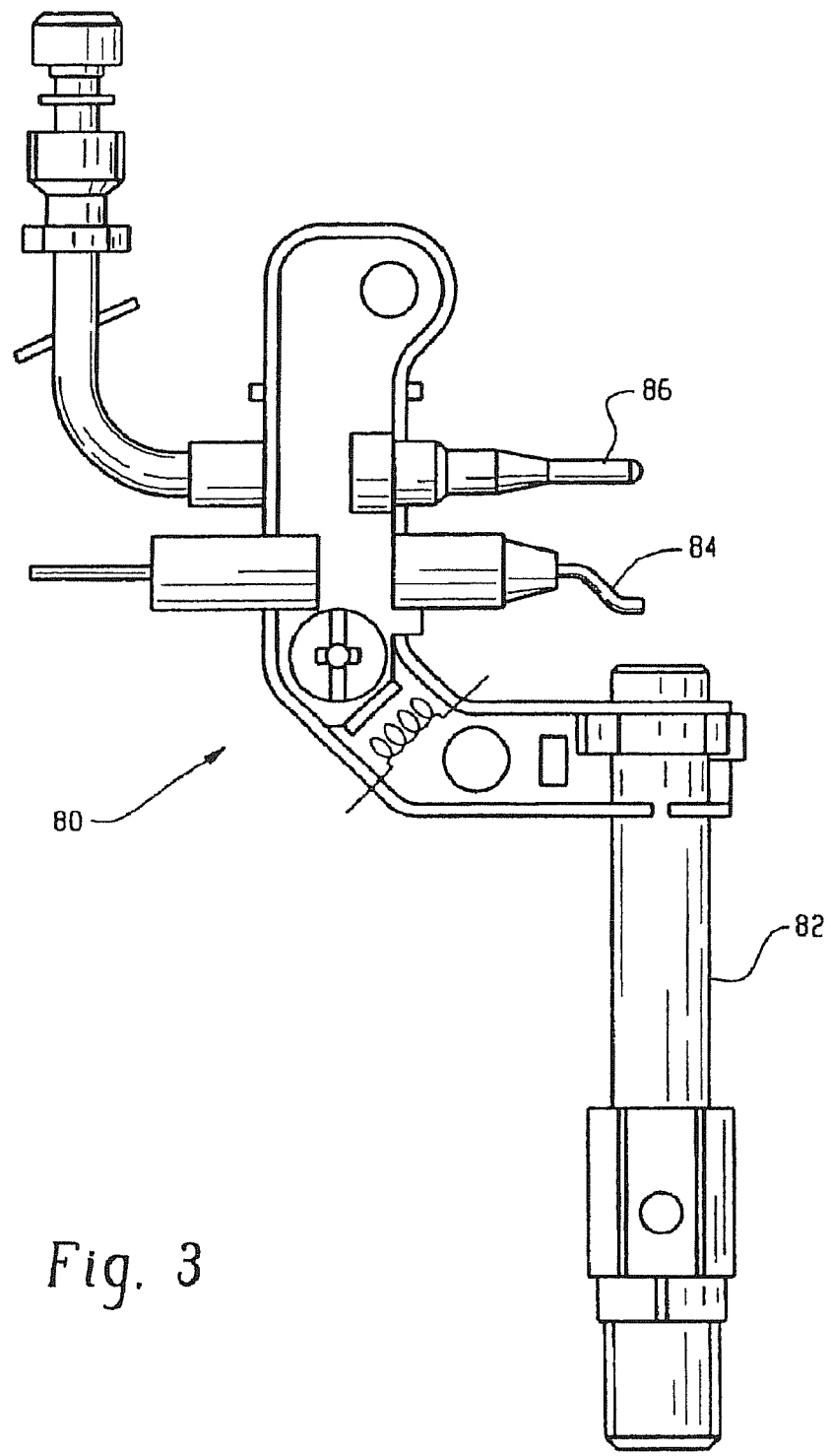
FIG. 3 is an enlarged elevational view of one embodiment of a thermocouple, spark igniter, and pilot tube assembly.
Figure 4:
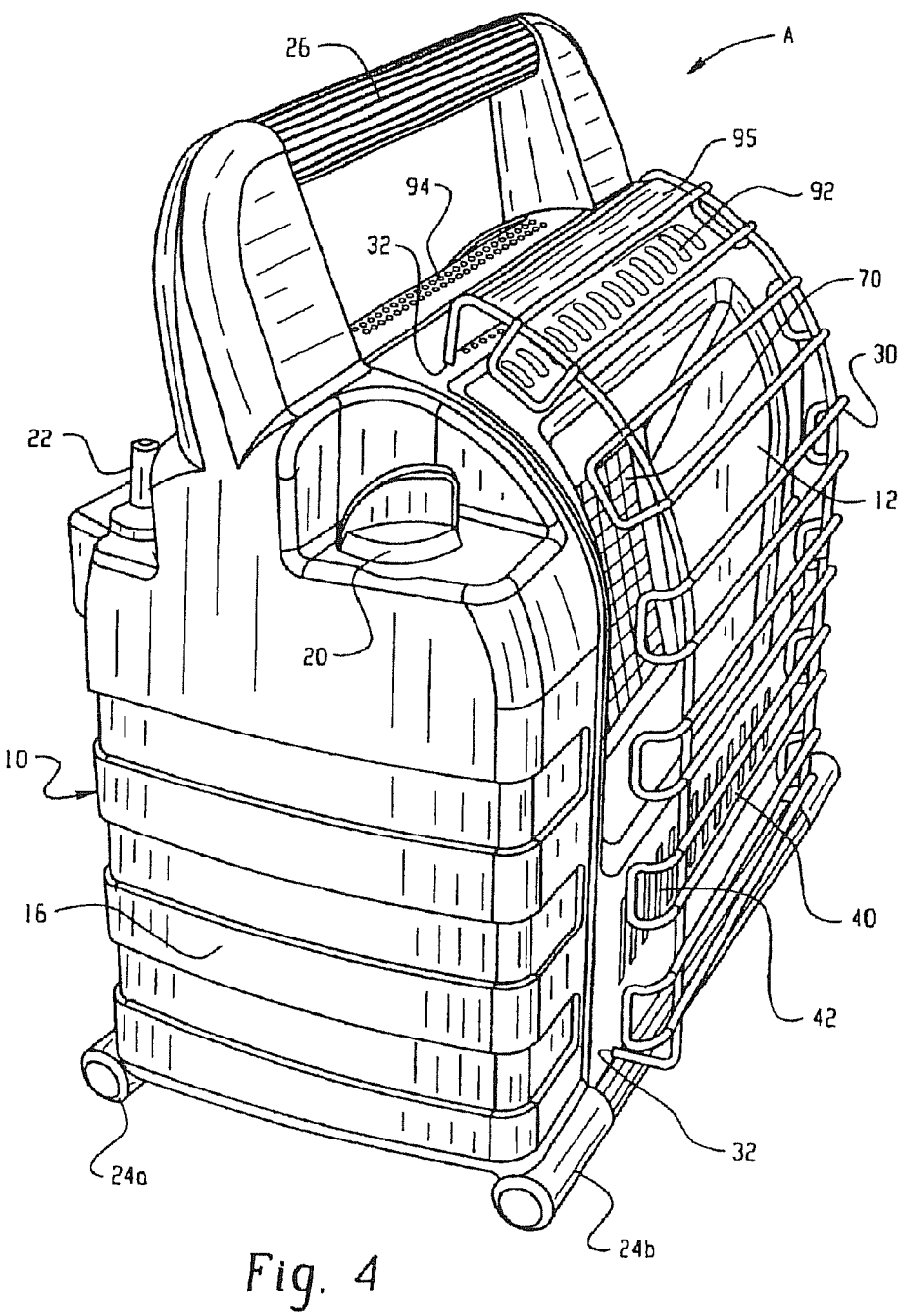
FIG. 4 is a perspective view of one embodiment of a heater taken generally from the front and left-hand side.

Referring now to the drawings wherein the showings are only for purposes of illustrating certain embodiments of the heater, and not for purposes of limiting same, the Figures show a portable heating device A adapted for use in small enclosed environments.

Referring, without limitation, to the embodiment depicted in FIGS. 1-27, the portable heater A includes a housing 10 having a front face 12, a rear face 14, and two sides 16, 18. The housing 10 may be manufactured to have smooth contours to prevent snagging or catching of things such as clothing, fabric, etc. A stepped recess or external cavity may be formed in a corner region of the left side 16 of the housing 10 for supporting a control knob or temperature controller 20. A recess provides protection against inadvertent contact and accidental changing of the temperature. In certain embodiments, the temperature controller 20 has four positions: off, pilot, low, and high (not shown) In certain embodiments, the temperature controller 20 has continuously variable positions for infinitely variable heating. A controller may incorporate a piezo spark igniter integral to controller stem rotation.

In certain embodiments, the heater A is supported by two elongated legs 24a, 24b laterally disposed along the outboard edges of the rear face 14 and front face 12 respectively. The legs 24a, 24b may be grooved to provide a friction surface to contact a supporting surface and may extend over the entire width of the housing to provide a wide "footprint" and stable support area for the heater. In another embodiment (not shown), additional legs extending front to rear are provided beneath legs 24a, 24b to increase air flow beneath the heater. A handle 26 extends from the top of the heater. In certain embodiments the handle 26 forms an angle directed away from the front face 12. In certain embodiments this angle is approximately 15°. An angle allows the handle 26 to remain cool for handling by a user as the angled orientation of the handle 26 protects the user's hand from heat exiting the top of the heater A while the user transports the heater A. In the alternative, a non-angled handle (not shown) provides a grip surface for carriage of the heater. The handle 26 may optionally be grooved to provide an enhanced gripping surface for the user.

In certain embodiments, a shield or metal grid 30 is attached to the front face 12 of the heater to provide protection to the heater components. In addition, the shield prevents accidental contact with the hot portions of the heater front face 12. The shield may be made from elongated wire or metal strips. In certain embodiments, peripheral pieces of the shield may be received in openings 32 in the housing to secure the shield to the heater. In certain embodiments, keyhole openings or recesses 34a, 34b are located on the upper portion of the back face 14 of the heater allowing the user to hang the heater.

The air inlet 40 may be any opening that adequately provides air inflow. In certain embodiments, an opening or air inlet 40 is disposed on a lower portion of the front face 12 of the heater for receiving and filtering air drawn into the housing. In certain embodiments the air inlet is formed from a series of elongated slits 42 spaced across the housing beneath the shield.

Figure 5:
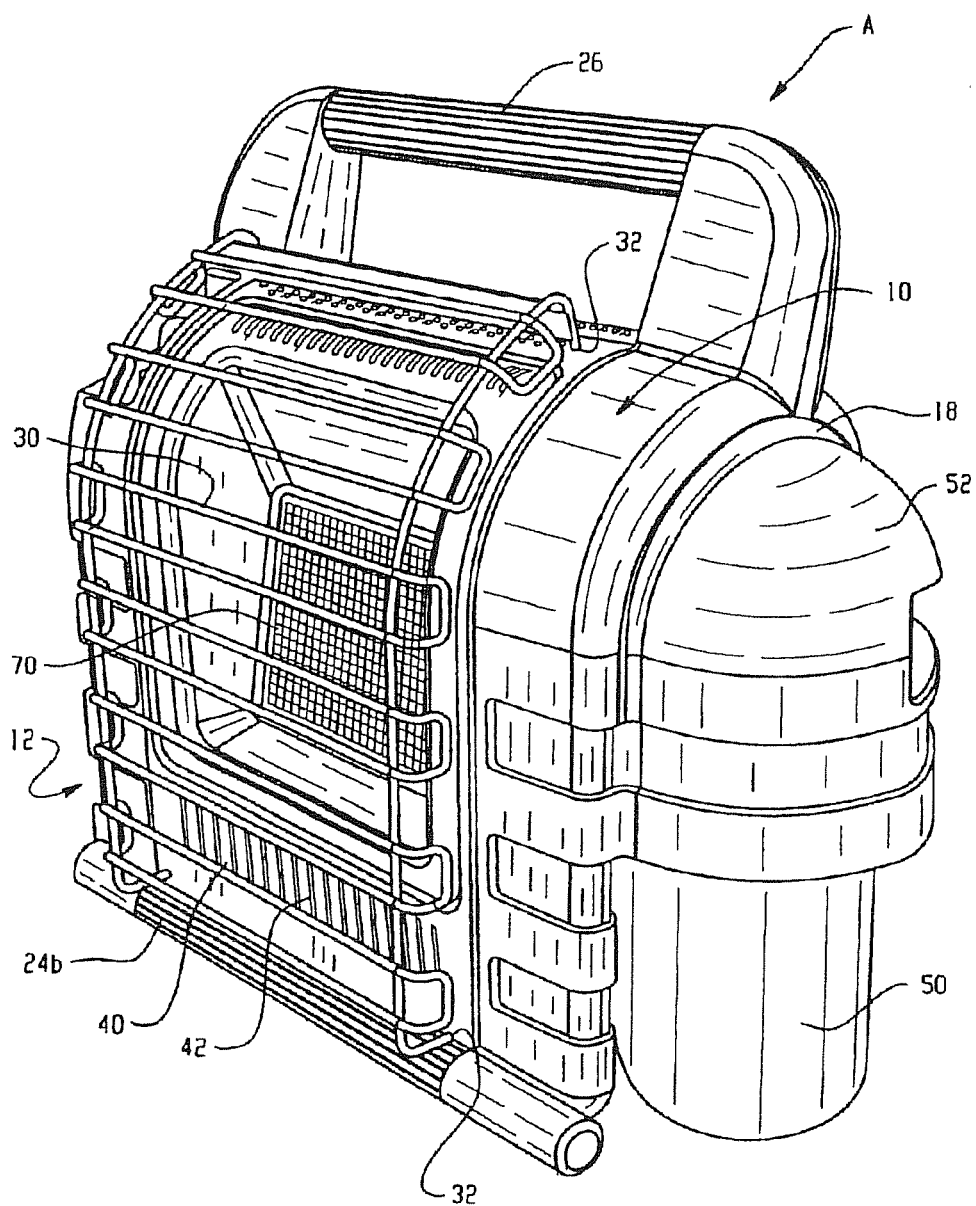
FIG. 5 is a perspective view of one embodiment of a heater taken generally from the front and right-hand side.
Figure 6:
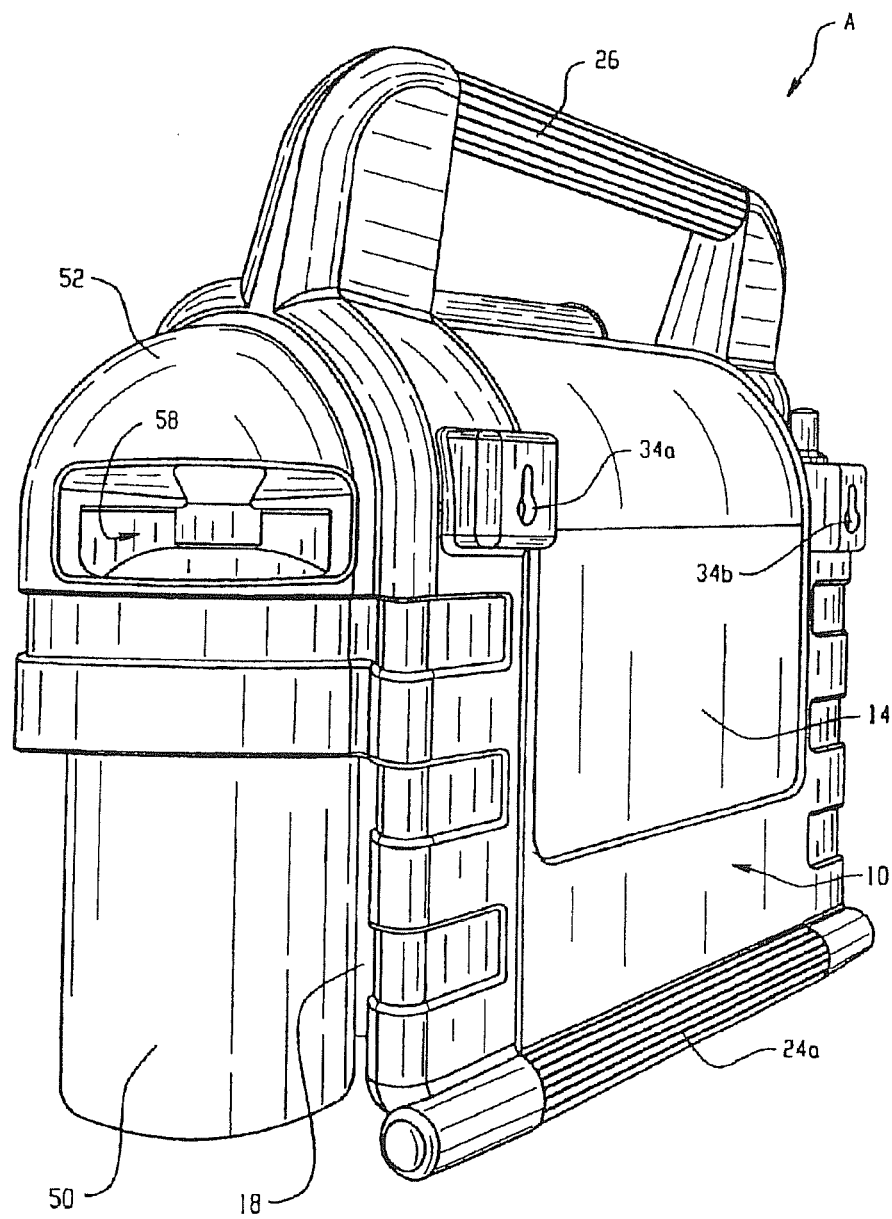
FIG. 6 is a perspective view of one embodiment of a heater taken generally from the rear and right-hand side.
Figure 7:
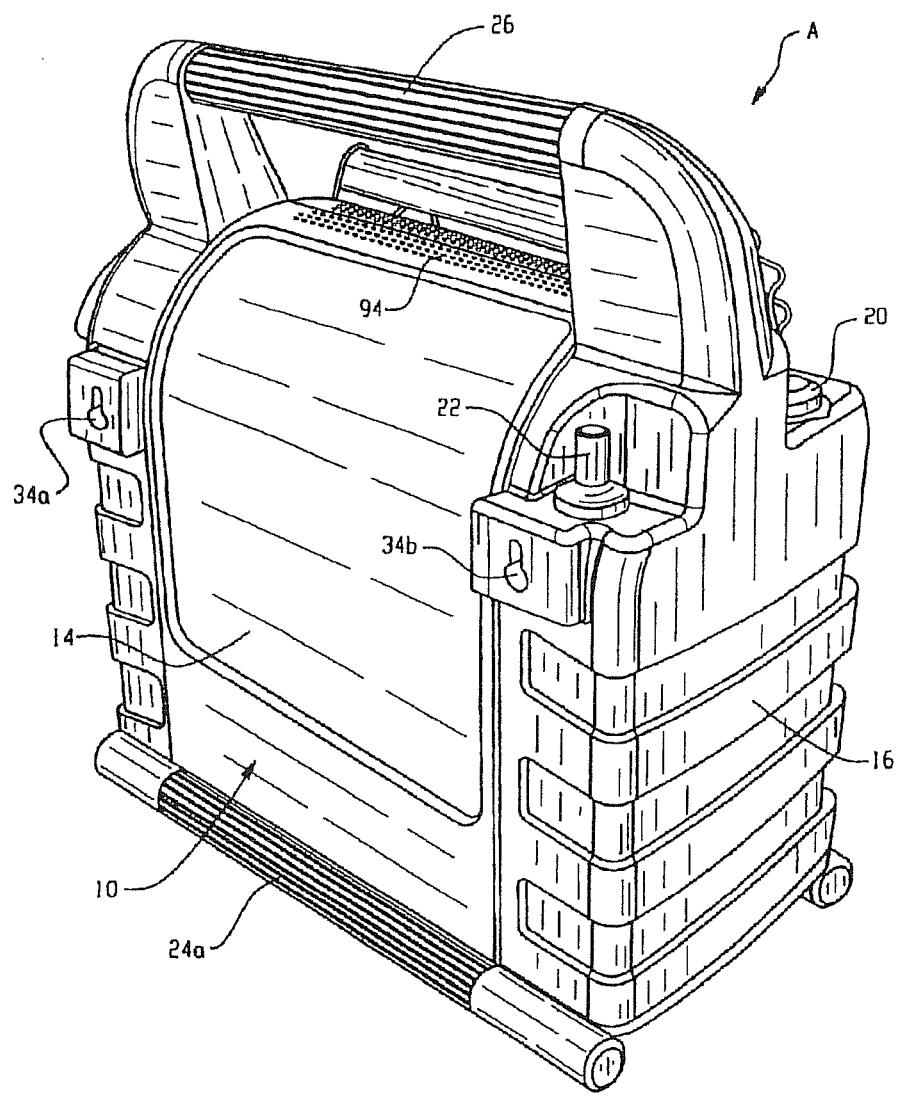
FIG. 7 is a perspective view of one embodiment of a heater taken generally from the rear and left-hand side.
Figure 8:
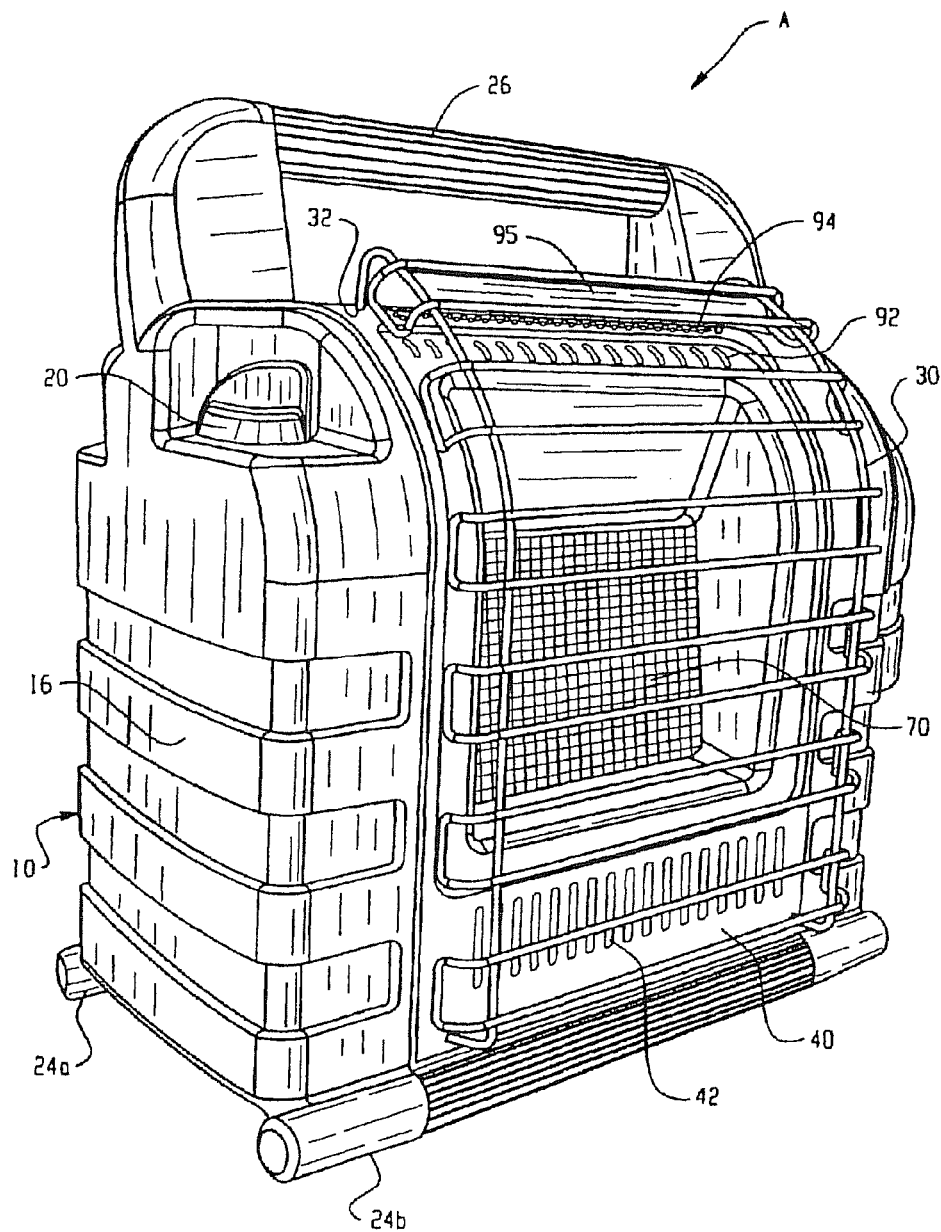
FIG. 8 is a perspective elevational view of one embodiment of a heater.
Figure 9:
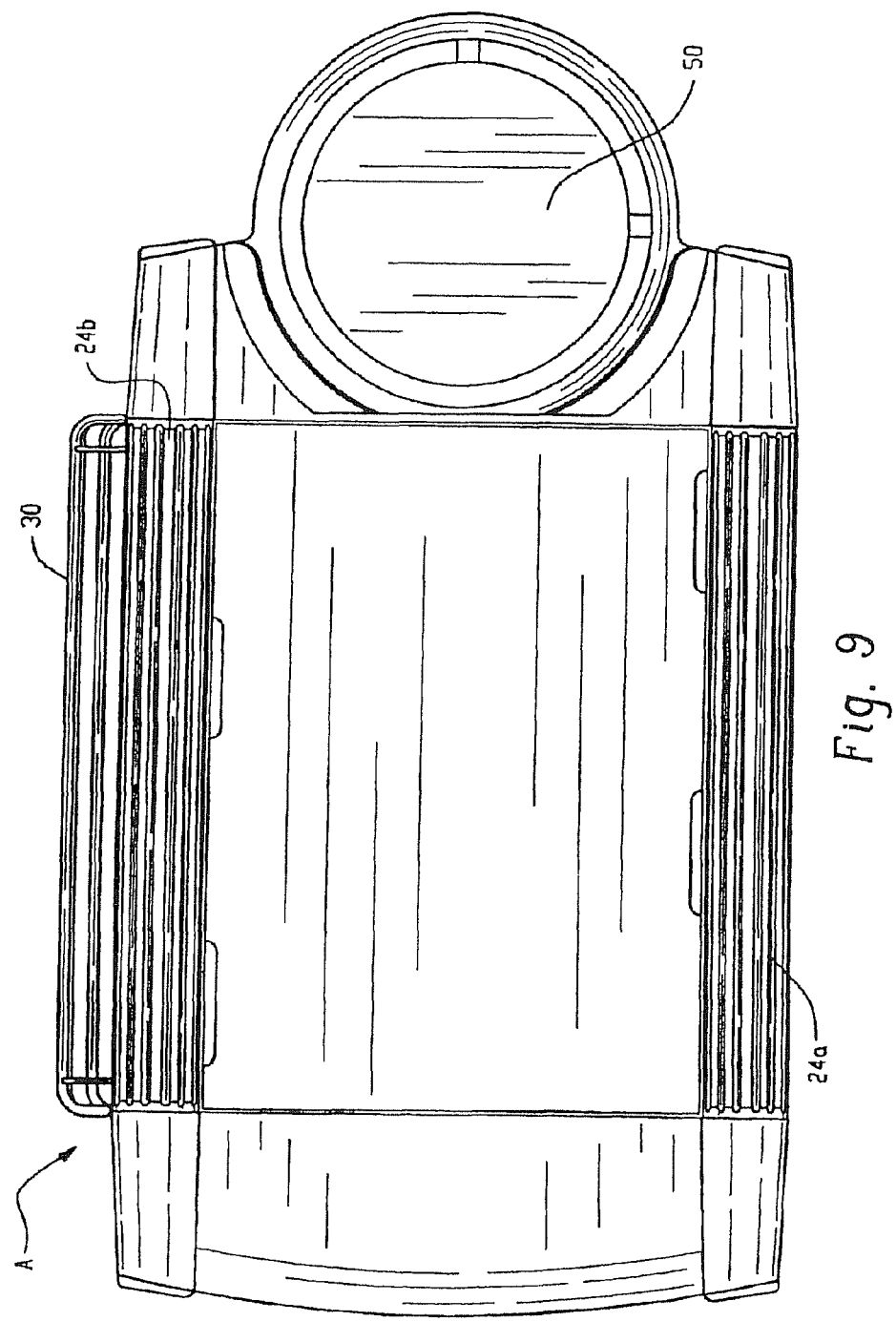
FIG. 9 is a bottom view of one embodiment of a portable heater.
Figure 10:
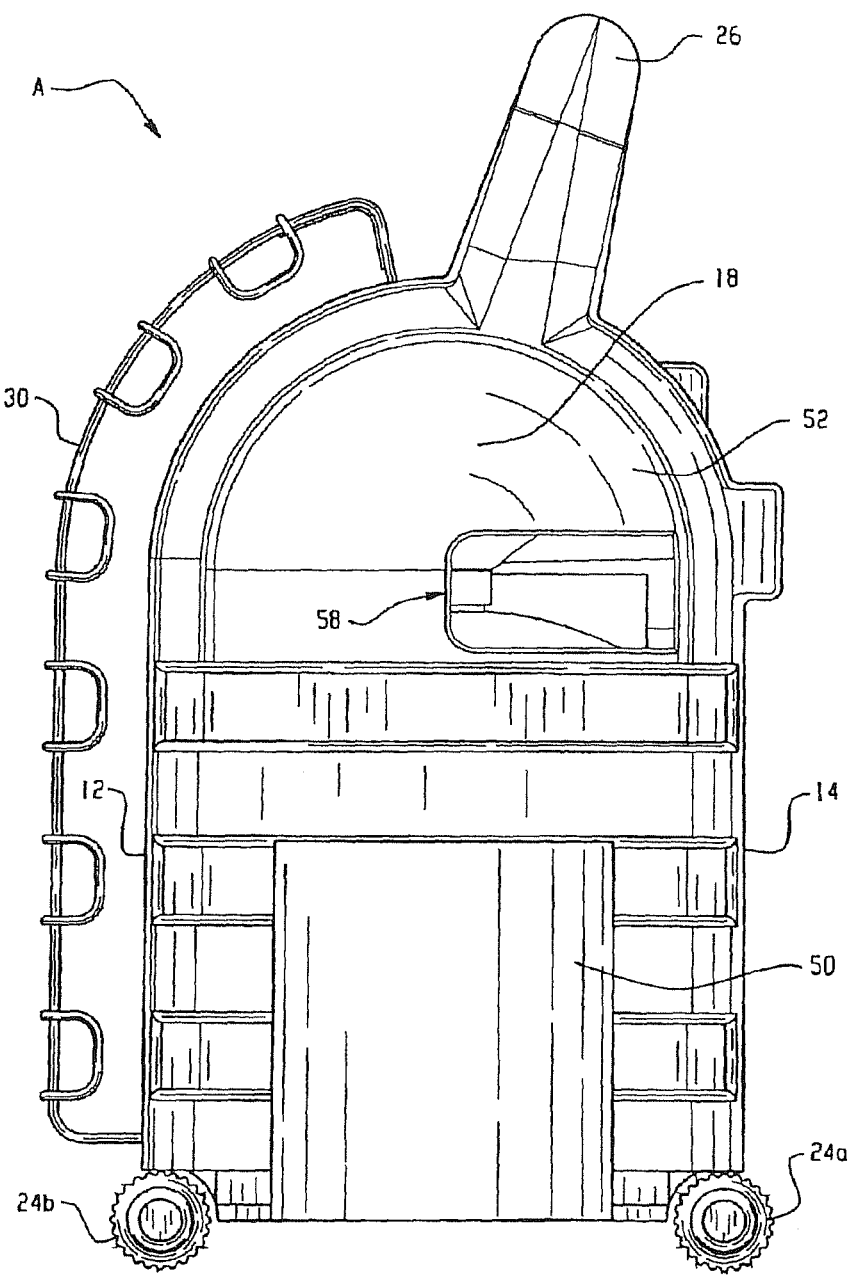
FIG. 10 is a side elevational view of one embodiment of a portable heater.
Figure 11:
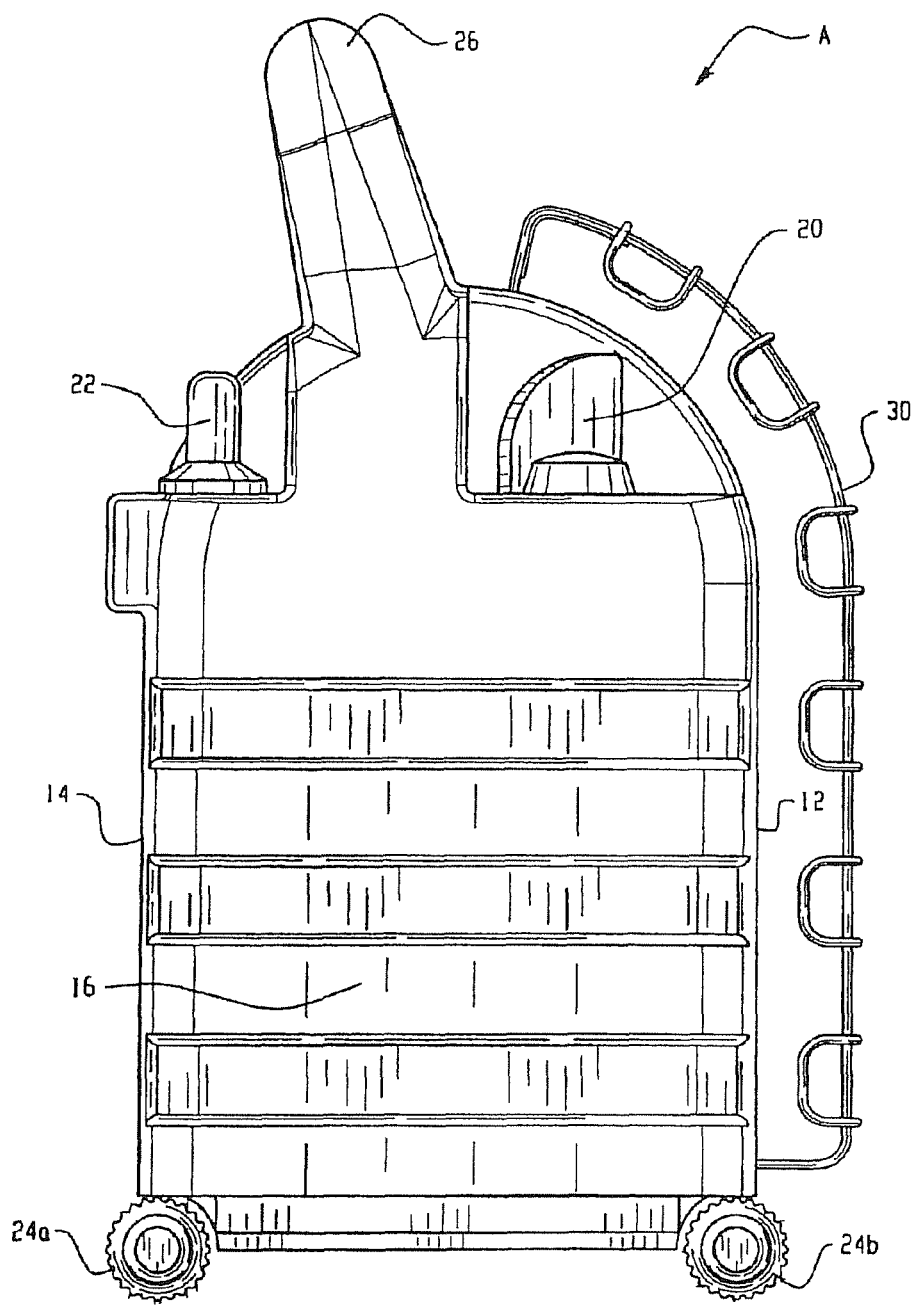
FIG. 11 is a side elevational view of one embodiment of a portable heater.
Figure 12:
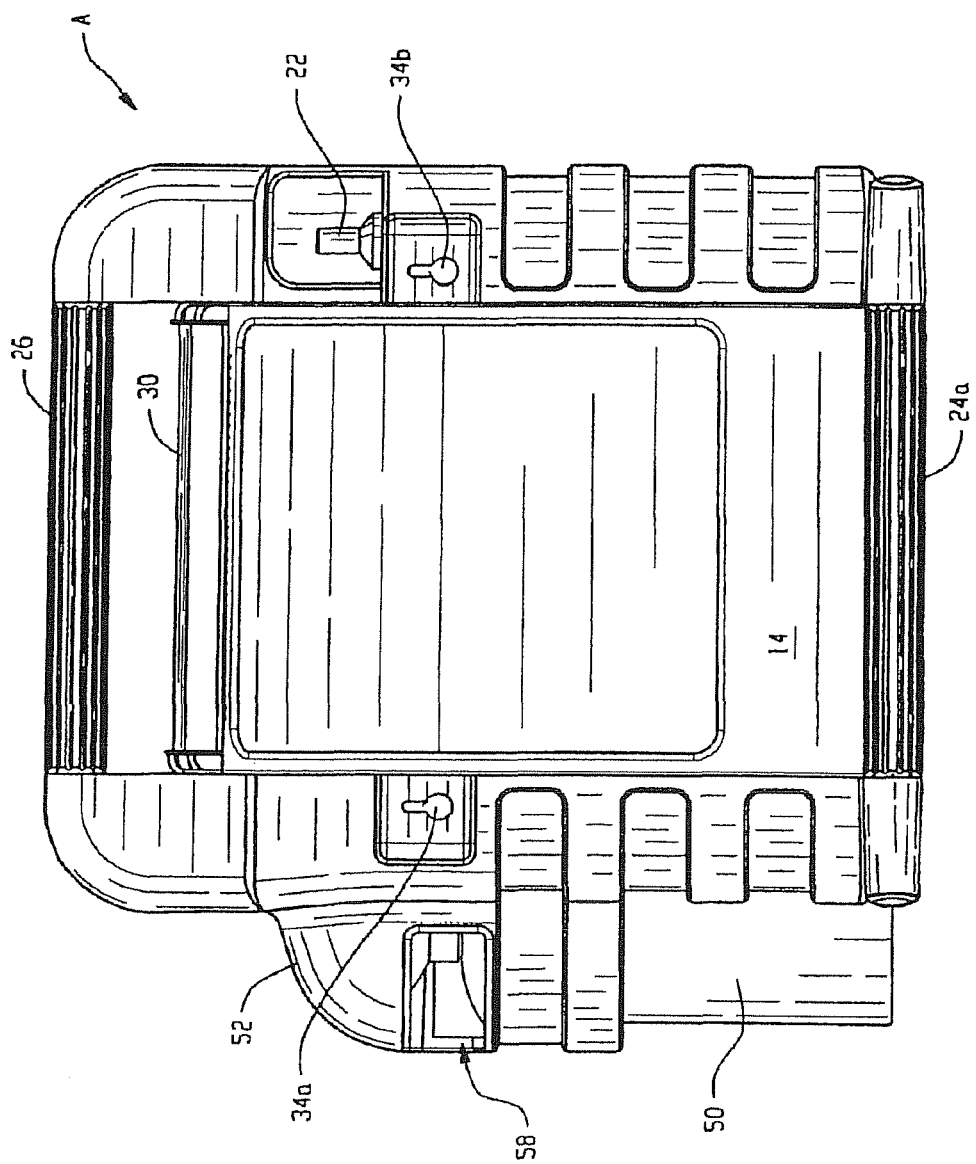
FIG. 12 is a rear elevational view of one embodiment of a portable heater.
Figure 13:
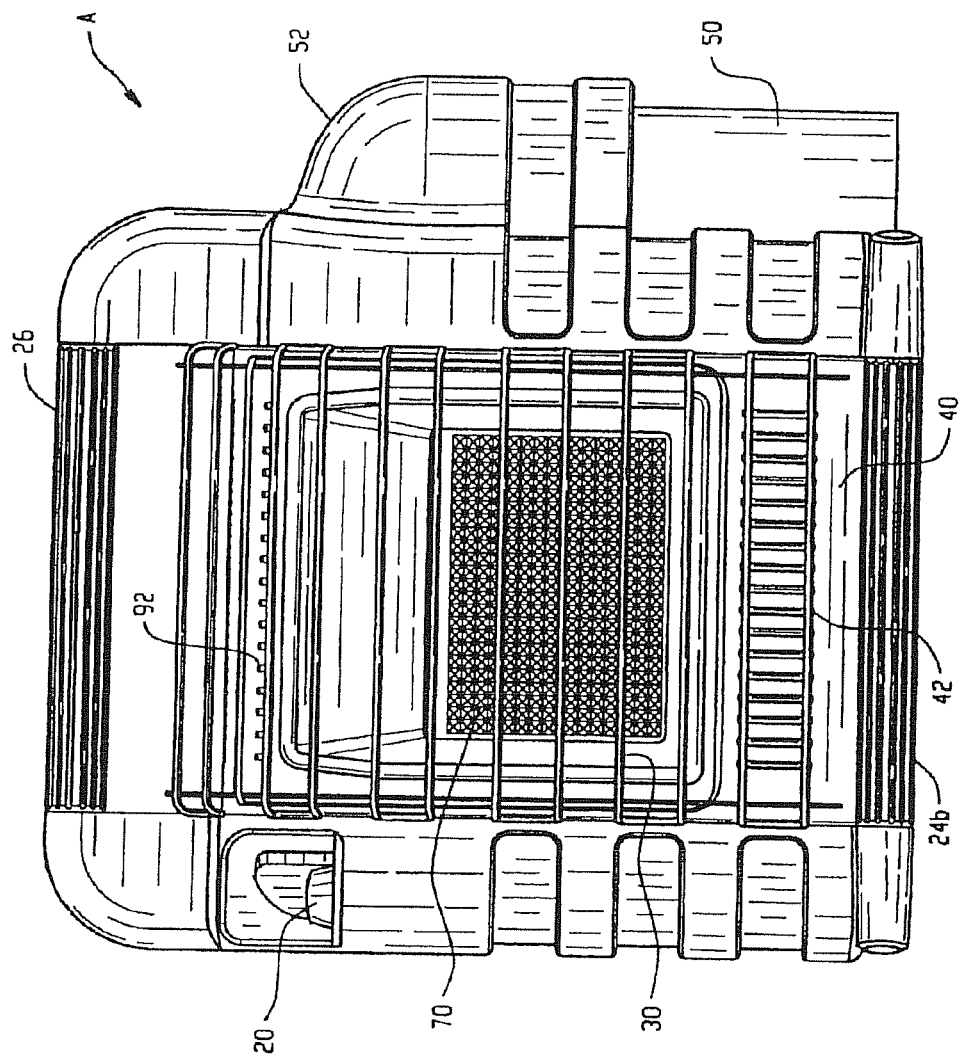
FIG. 13 is a front elevational view of one embodiment of a portable heater.
Figure 14:
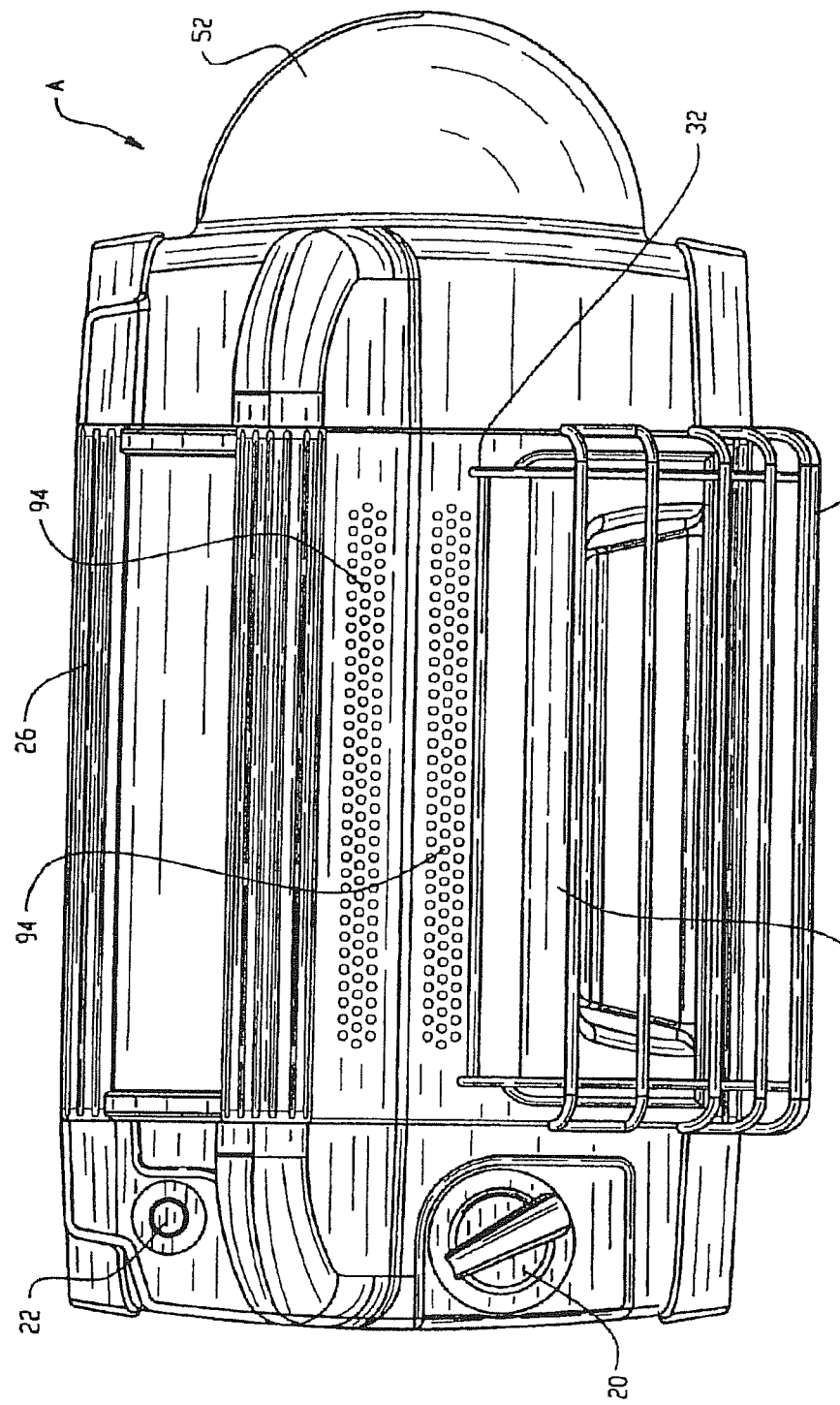
FIG. 14 is a top view of one embodiment of a portable heater.
Figure 16:
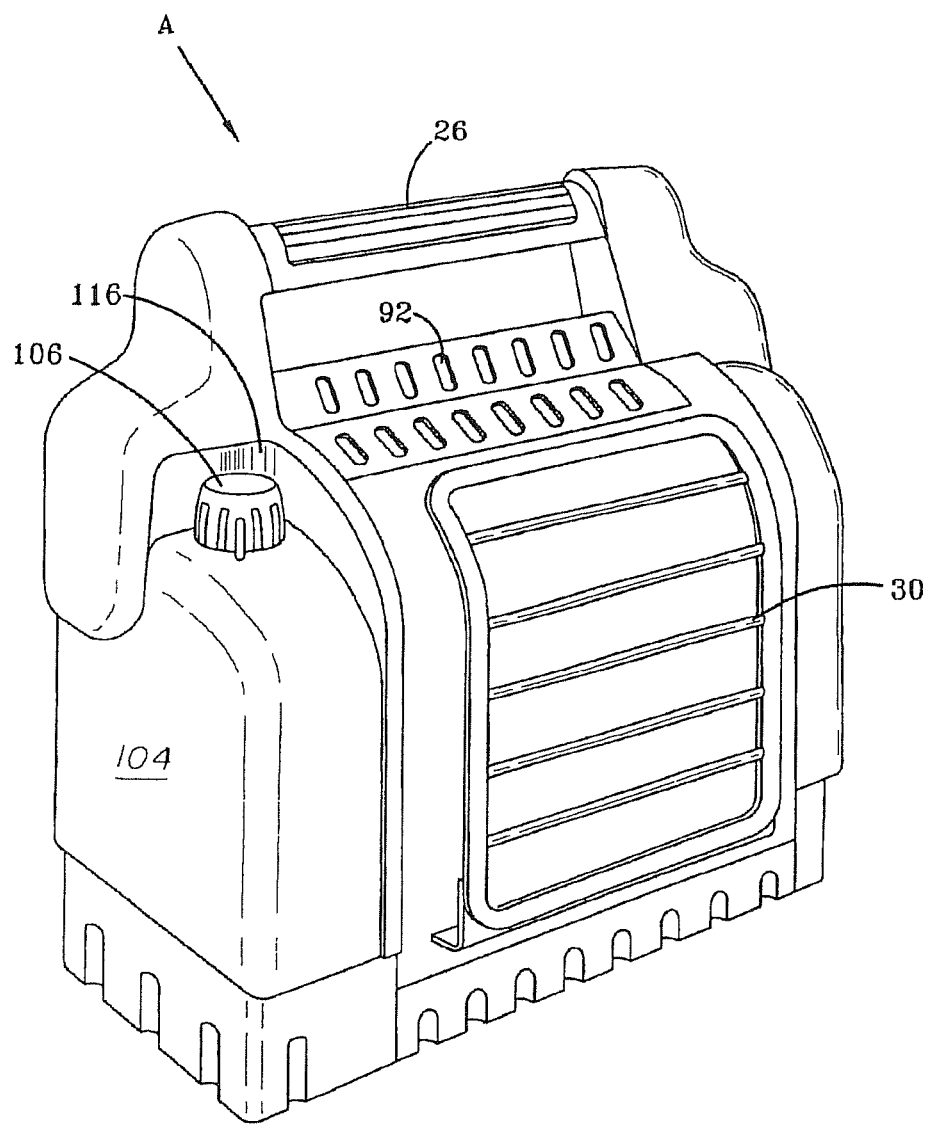
FIG. 16 is a perspective view of one embodiment of a portable heater.

In certain embodiments, an LP ("Liquefied Petroleum" or "Liquefied Propane") gas supply 50 is secured to and partially enclosed by the housing 10 (See FIGS. 5 and 6). An LP gas supply 50 may be a removable canister or propane tank that can be replaced by a new tank or removed, refilled, and re-installed in the housing. In certain embodiments, an LP gas supply comprises a one pound propane cylinder. In certain embodiments, a dome 52 protrudes from the side 18 of the housing 10 and partially encloses the gas supply tank 50. The dome acts as a protective shroud to cover the interconnection of the tank with the housing. In certain embodiments, an LP gas supply comprises a twenty pound propane tank. Without limitation, a twenty pound propane tank may be connected to the heater by length hose so that the tank can be located away from the heated region. Without limitation, a hose connected propane tank can be positioned outside a tent, cabin, fishing shanty garage, etc. while the heater is located within the structure.

The gas supply 50 is connected to a regulator which connects to a valve and orifice 56 (See FIG. 1) which is selectively adjustable between open and closed positions, access being provided to the regulator through window opening 58 for remote LP gas supply hose tightening and leak checking (see FIG. 6). Optionally the LP gas supply hose 130 with connector fittings 132, 134 is stored underneath the unit within receptacles 136 in combination with side ledges 138 illustrated in FIG. 27. It is recognized that the LP couplings may be "quick connects" when the supply pressure is already regulated to about 11" water column. In this embodiment, the quick-coupler hose is integral to the heater and downstream from heater regulator(s) but before the control valve to facilitate connection to a regulated hose supply from an external fuel source such as a 20 pound cylinder. Similarly, the regulated fuel supply (11" water column) could originate from a self-contained system as in a recreational vehicle. The quick-coupler hose connection would incorporate positive fuel shut-off in both male and female connection components to prevent fuel escape when disconnected.

Referring again to FIGS. 1 and 2, a burner venturi 60 is enclosed within the housing 10 and operates to mix oxygen and propane for combustion. The burner venturi 60 has a hollow generally cylindrical body 62 and a tapered mouth 64 having a wider diameter than the body 62. The burner venturi is disposed at an angle α relative to the longitudinal axis of the heater A. The mouth 64 of the burner venturi is positioned on approximately the same axial plane as the air inlet 40 and the cylindrical body 62 extends upwardly from the mouth 64. The orifice 56 which is attached to the gas supply 50 is located directly beneath the mouth 64 of the burner venturi 60.

Also located within the housing A is a generally planar radiant surface 70 disposed at an angle α relative to the longitudinal axis of the heater. A rear face of the radiant surface is in communication with a cavity or plenum chamber 72. The burner plenum receives the air/gas mixture from the venturi and distributes the mixture over and through the rear face of the radiant surface. Thus, in operation, the orifice 56, attached to the gas supply, is opened releasing a fuel gas such as propane into the mouth 64 of the burner venturi 60. Associated with the orifice is a regulator that reduces the delivery pressure of the fuel gas from the tank (rated up to 150 psi) to eleven inches of water column in one stage. Thus, this portable heater operates at a significantly lower pressure than existing commercially available units. The stream of gas exiting the orifice 56 creates a vacuum effect drawing air from the air inlet 40 into the mouth 64 of the burner venturi. Propane and air are thoroughly mixed in the burner venturi 60 and plenum 72 in order to achieve complete combustion and produce a clean burning infrared heating surface. The mixture of oxygen and propane travels upward through the cylindrical body 62 of the burner venturi 60 until reaching the plenum chamber 72. To prevent the mixture of propane and oxygen from immediately exiting the plenum chamber 72, a solid baffle 76 is provided which forces the air/gas mixture downward into communication with the rear face of the radiant surface.

The radiant surface may be a burner tile or a multi-ply screens (not shown) that define a plurality of small openings which permit combustion of the air/gas mixture as it passes therethrough. A means is provided for initially sparking or igniting the mixture at the radiant surface. In the present invention a container 80 houses the pilot 82 and the igniter 84 (see FIG. 3) which provides the initial sparking. It will be appreciated that any conventional means for initially sparking or igniting the mixture can be utilized. Combustion of the air/gas mixture is maintained and reaches elevated temperatures of approximately 1200° F. The heater shown in the drawings with one propane cylinder is rated at a minimum 4000 BTUs and a maximum 9000 BTUs at eleven inches water column pressure. Other ratings are also potential alternatives, including up to 20,000 to 25,000 BTU models when more than one propane cylinder and associated burner assemblies are utilized.

A reflector 90 extends outwardly from the top of the burner plenum 72 at an angle directed toward the top portion of the front face 12 of the housing 10. The natural convective upward path of the combustion products leads the combustion products into contact with the reflector 90. The reflector 90, in addition to directing the radiant energy output from the heater toward the front surface of the housing, also acts as a deflector and reduces the temperature of the combustion products exiting the heater which greatly reduces the chance for ignition of a combustible material if it comes into contact with the heater. An outlet 92 is disposed near the top of the housing 10 allowing warm air to mix with combustion products and exit the device after contacting the reflector 90. In addition, a deflector 95 is disposed on the top of front face 12 which reduces the temperature of the combustion products exiting the heater which greatly reduces the chance for ignition of a combustible material if it comes into contact with the heater A.

In addition, there is an outlet or grate 94 disposed rearward of outlet 92 that communicates with the interior of the housing. It provides a continuous flow path for air (that does not enter the venturi) to flow from the inlet 40 around the rear of the plenum chamber and exit the housing rearward of the deflector. This enhances the chimney effect as described above since a large amount of ambient air is drawn into the housing, a portion used for combustion purposes and the remainder convects upwardly along the rear of the plenum and the deflector to exit via the openings 94. The air inlet 40 of the present invention is designed to encourage air flow along the back of the hot burner plenum 72, advantageously resulting in an increased velocity of air flow to the burner venturi, as well as cooling the rear housing 10. As the burner venturi 60 is heated, the thermal convection properties urge the air/gas mixture through the upwardly angled burner venturi 60 creating a chimney type effect. The chimney effect created by the present invention increases the fresh air flow velocity into the burner venturi, enabling the pressure from the gas supply 50 to be reduced, yet burn efficiently on high or low settings.

In certain embodiments the heater may comprise carbon dioxide detector system. A carbon dioxide detector system comprises a carbon dioxide detector. A carbon dioxide detector system comprises a PC board. A carbon dioxide detector system comprises a power supply battery. Without limitation, the batteries comprising a power supply may comprise two (2) "D" Cell batteries or any combination of quantity and different cell sizes.

A carbon dioxide detector system provides a safety function by operating to shut off the fuel supply at a some predetermined operational state or gaseous range (%). In certain embodiments, the carbon dioxide detector system performs the following operations: 1) produce atmospheric carbon dioxide data by measuring the carbon dioxide in the atmosphere using the carbon dioxide detector 2) produce atmospheric oxygen data by calculating an atmospheric oxygen level from the atmospheric carbon dioxide data using the computer, 3) compare atmospheric oxygen data to a predetermined atmospheric oxygen level, 4) If the atmospheric oxygen data is less than the predetermined atmospheric oxygen level, discontinue a signal output ("open valve signal") necessary to keep a normally closed safety valve open. In the described embodiment, if the atmospheric oxygen data is less than the predetermined atmospheric oxygen level the safety valve is closed due to lack of the open valve signal.

The predetermined atmospheric oxygen level may be any oxygen level. In certain embodiments the predetermined atmospheric oxygen level is at least 18%.

In certain embodiments, a carbon dioxide detector system safety interlock functionality is included whereby interruption of the functionality of a carbon dioxide detector system results in the safety valve being closed due to removal of a signal necessary to keep it open. In certain embodiments, if the carbon dioxide detector system is de-energized by removal, disruption, or failure of the power supply element, the open valve signal will be discontinued, thereby closing the safety valve.

In certain embodiments a carbon dioxide detector system may operate in conjunction with a standing pilot and safety valve. Without limitation, in certain heaters comprising a carbon dioxide detector system operable in conjunction with a standing pilot and safety valve, a flame from the standing pilot is controlled by the carbon dioxide detector system. When the atmospheric oxygen data is equal to or above the predetermined atmospheric oxygen level, the carbon dioxide detector system maintains the flame in a state to heat a thermocouple to produce the open valve signal needed to keep the safety valve open. When the atmospheric oxygen data is less than the predetermined atmospheric oxygen level, the carbon dioxide detector system will interrupt the open valve signal. Interruption of the open valve signal may be by opening a circuit or discontinuation of the signal production.

Figure 26:
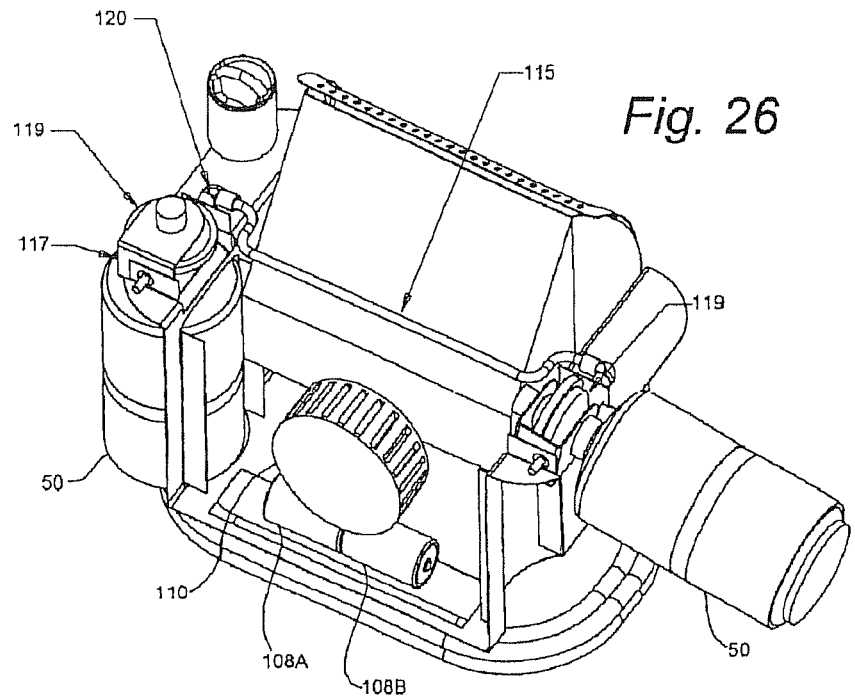
FIG. 26 is a rear perspective view with rear and side panels removed.
Figure 27:
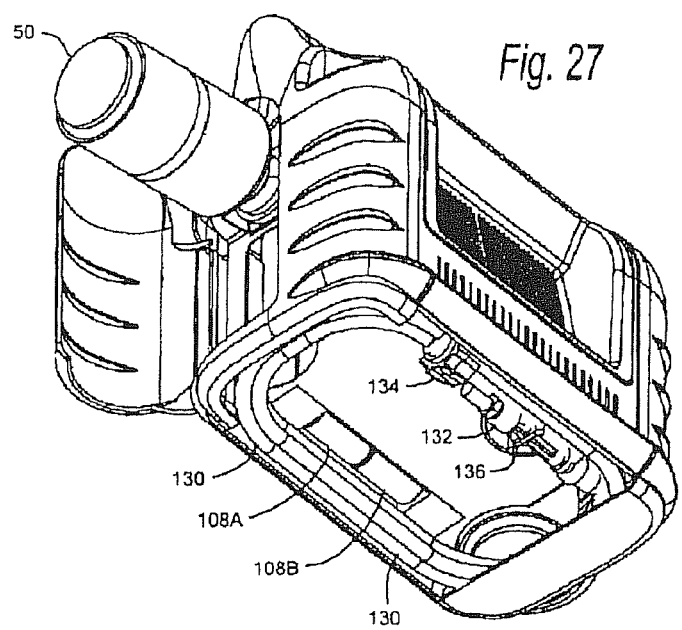
FIG. 27 is a bottom perspective view illustrating a remote LP gas supply hose.

FIG. 17 illustrates yet another embodiment of the invention in which improved air flow is effected through heater unit A by the incorporation of a paddle or cage fan 110 in back panel 14. In one aspect shown in FIG. 16, a rechargeable battery pack 104 is illustrated to be positionable within accommodating slot 116 within side panel 16 of housing 10. Knob 106 is used to variably define the power setting used with battery pack 104 as well as to be used as an "on/off" switch for controlling the speed of fan 110. Alternatively, and in another aspect of the invention, at least one, preferably two or more rechargeable dry cell batteries, 108 a, 108 b are employed within side panel 16 of housing 10 as better illustrated in FIG. 17. The batteries are positioned to be loaded from the bottom of housing 10 and, the power controlled by a variably positioned knob 106 located toward the front of housing 10 or at an alternative position as is known in the art for controlling variable amounts of power to an electrical device. Depending on the rotational speed of the fan desired, coupled with battery life expectancy, anywhere from one to four "C" or "D" sized batteries are employed, although it is equally envisioned that "AA" batteries may be used in some models where power consumption is envisioned to be minimal or usage infrequent and for short duration. Fan 110 has a plurality of paddles or inwardly extending panels for creating air movement through rotational pivotal movement about axis 114. The fan is typically a lower voltage fan, e.g., 3.0 volts, powered by a direct current motor. This increased air flow insures maximal cooling capacity on various metal and plastic components in heater A. Battery operation is also illustrated in FIG. 26 where an alternative dry cell location is identified.

Figure 19:
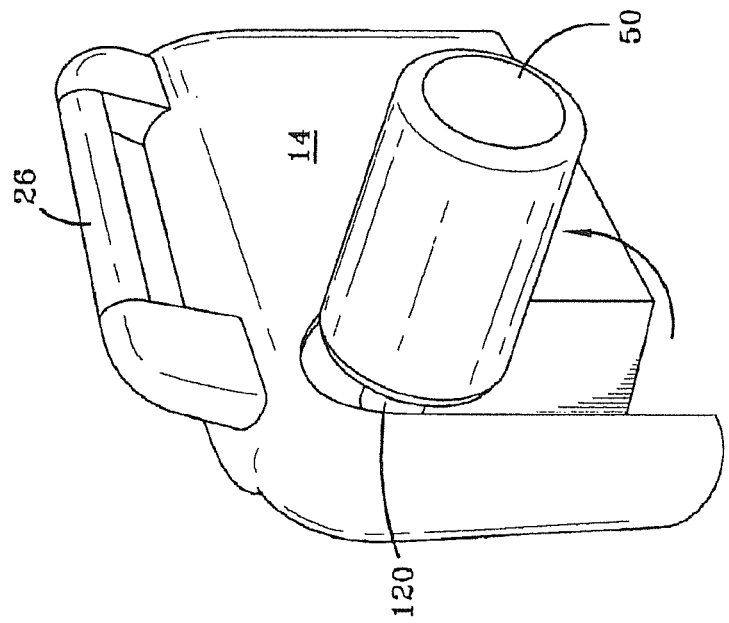
FIG. 19 is a perspective view of one embodiment of a portable heater.
Figure 18:
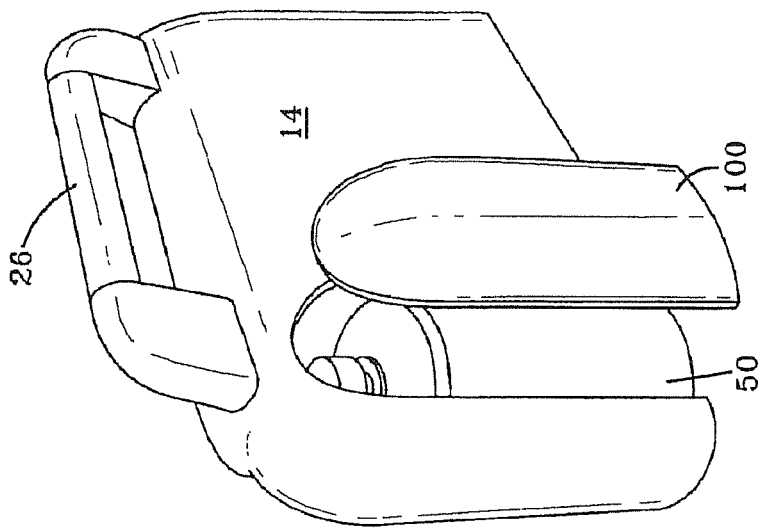
FIG. 18 is a perspective view of one embodiment of a portable heater.

FIGS. 18-19 illustrate another embodiment of the invention in which a snap-fit door 100 is removable from side panel 18.

FIGS. 20-27 illustrate yet another embodiment of the invention in which more than one fuel source is positionable within the housing. As illustrated in FIG. 20, two fuel sources 50 *a*, 50 *b* are positioned within side wall 18 and at least partially covered by dome-shaped shoulders, and in one aspect, completely enclosed therein as illustrated in FIG. 21. Temperature controller button 20 and igniter button 22 are positioned similarly to that shown previously in FIG. 4.

In FIGS. 22-23, two fuel sources 50 *a*, 50 *b* which are at least partially enclosed by dome-shaped side panels 52 *a*, 52 *b* are positioned on opposed sides 18, 16 of heater housing 10. In this particular embodiment, the units are connected by a mixing valve (not shown) and the temperature controller button 20 and igniter button 22 operate to control a single burner unit.

In FIGS. 24-25, two fuel sources 50 *a*, 50 *b* are once again shown, the canisters protruding at least partially from the rear 14 of heater housing 10. As illustrated in this embodiment, each fuel source has its individual temperature controller buttons 20 *a*, 20 *b* and igniter buttons 22 *a*, 22 *b* for controlling the temperature of heater A.

It is recognized that when dual fuel source applications are discussed, it is recognized that the heat capacity of each burner need not be the same, and it is within the scope of this invention that different capacity burners are envisioned. For maximum heat control by the end-user, it is within the scope of the invention that one burner will be for "low" capacity applications and wherein the second burner will be for "high" capacity applications, and wherein the two burners can be used in combination to produce yet a higher capacity unit. For other applications, there will be two "low" capacity burners employed within one unit as well as applications where there will be two "high" capacity burners employed within the same unit. In a more expensive version of the heater, two continuously variable burners will be employed, such variability predicated by the rate at which fuel and/or air is supplied to the burners as well as the capacity of the burners.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

While the gas-fired heater with carbon dioxide detector has been described above in connection with the certain embodiments, it is to be understood that other embodiments may be used or modifications and additions may be made to the described embodiments for performing the same function of the gas-fired heater with carbon dioxide detector without deviating therefrom. Further, all embodiments disclosed are not necessarily in the alternative, as various embodiments may be combined to provide the desired characteristics. Variations can be made by one having ordinary skill in the art without departing from the spirit and scope of the gas-fired heater with carbon dioxide detector. Therefore, the gas-fired heater with carbon dioxide detector should not be limited to any single embodiment, but rather construed in breadth and scope in accordance with the recitation of the attached claims.

I claim:

1. A portable gas-fired radiant heater comprising:
   a housing;
   a fuel source;
   a fuel connection fitting;
   an air inlet;
   a burner assembly mounted within the housing, said burner assembly comprising
      a fuel valve adapted to control communication with said fuel source
   a radiant surface in the housing, said radiant surface adapted to function as a combustion site; and
   an automatic shutoff mechanism operatively associated with the burner assembly for shutting off the fuel valve in response to a detection of a predetermined level of carbon dioxide,
      said automatic shutoff mechanism comprising,
         a carbon dioxide detector,
         a standing pilot,
         a safety valve,
         a PC board, and
         a power supply.

2. The portable heater of claim 1 further comprising an igniter.

3. The portable heater of claim 1 wherein said fuel source comprises a propane fuel tank.

4. The portable heater of claim 1 wherein said fuel source comprises at least two propane fuel tanks, wherein said propane fuel tanks are completely enclosed within said housing.

5. The portable heater of claim 1 further comprising a controller for selectively switching operation states of the portable heater.

6. The portable heater of claim 1 further comprising a regulator for reducing pressure from an associated fuel source.

7. The portable heater of claim 1 further comprising
   a fan; and
   a power source for said fan.

8. The portable heater of claim 7 wherein said power source is selected from the group consisting of a dry cell battery, a battery pack, and combinations thereof.

9. The portable radiant heater of claim 1 wherein the automatic shutoff mechanism shuts off at measured carbon dioxide levels at a predetermined level.

10. The portable radiant heater of claim 1 wherein the automatic shutoff mechanism shuts off at calculated oxygen levels of approximately at least 18%.

11. The portable heater of claim 1 wherein said fuel source comprises at least two propane fuel tanks, wherein the first propane tank has a first temperature controller and a first igniter and the second propane tank has a second temperature controller and a second igniter.

12. A portable gas-fired infrared heater comprising:
   a housing, said housing comprising
      a handle adapted for transporting the heater, and
      an air inlet;
   a regulator;
   a burner assembly mounted within the housing, said burner assembly comprising
      a fuel valve adapted to control communication with a fuel source, a venturi for mixing air from the air inlet and fuel from the fuel valve into a fuel-air mixture;
a radiant surface, said radiant surface
  recessed into the housing,
  disposed at an angle to vertical, and
  comprising a rear face;
a plenum chamber adjacent to said radiant surface, said plenum chamber
  in communication with said radiant surface, and
  adapted to distribute said fuel-air mixture onto the rear face of the radiant surface; and
a carbon dioxide detector system,
  said carbon dioxide detector system adapted to shut off the fuel valve in response to detection of a predetermined level of carbon dioxide, and
  said carbon dioxide detector system comprising,
    a standing pilot,
    a safety valve,
    a PC board, and
    a power supply.

13. The portable heater of claim 12 further comprising a control knob adapted for selecting various operative states of the heater.

14. The portable heater of claim 12 further comprising an elongated hose assembly adapted for connecting the heater to a fuel source.

15. The portable heater of claim 12, wherein said fuel source is a propane tank.

16. The portable heater of claim 12 further comprising an igniter.

17. The portable heater of claim 12 which further comprises
  a fan adapted to increase air circulation through said heater; and
  a power source adapted to power said fan,
    said power source comprising a member selected from the group consisting of a dry cell battery, a battery pack, and combinations thereof.

18. The portable heater of claim 12 wherein said fuel source comprises at least two propane fuel tanks, wherein said propane fuel tanks are completely enclosed within said housing.

19. The portable heater of claim 12 wherein said fuel source comprises at least two propane fuel tanks, wherein the first propane tank has a first temperature controller and a first igniter and the second propane tank has a second temperature controller and a second igniter.

20. The portable heater of claim 12 wherein the carbon dioxide detector system measures the carbon dioxide in the atmosphere, calculates an oxygen level from the measured carbon dioxide, compares the calculated oxygen level to a predetermined oxygen level, and interrupts a signal output necessary to keep the safety valve open when the calculated oxygen level is less than the predetermined oxygen level.

\* \* \* \* \*